US007401197B2

(12) United States Patent
Kezuka et al.

(10) Patent No.: US 7,401,197 B2
(45) Date of Patent: Jul. 15, 2008

(54) DISK ARRAY SYSTEM AND METHOD FOR SECURITY

(75) Inventors: Teiko Kezuka, Odawara (JP); Tetsuya Abe, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 155 days.

(21) Appl. No.: 11/336,839

(22) Filed: Jan. 23, 2006

(65) Prior Publication Data

US 2007/0192557 A1    Aug. 16, 2007

(30) Foreign Application Priority Data

Nov. 18, 2005  (JP)  ............... 2005-334584

(51) Int. Cl.
*G06F 12/00* (2006.01)
*G06F 12/14* (2006.01)
*G06F 12/16* (2006.01)
*G06F 13/00* (2006.01)

(52) U.S. Cl. ............... 711/164; 711/114; 711/115; 711/154; 711/152; 711/161; 711/162; 711/163

(58) Field of Classification Search ............... 711/114, 711/115, 154, 152, 161, 162, 163, 164
See application file for complete search history.

(56) References Cited

U.S. PATENT DOCUMENTS 7,178,021 B1* 2/2007 Hanna et al. ............... 713/155

2005/0005091 A1* 1/2005 Suzuki ............... 713/150

FOREIGN PATENT DOCUMENTS

| JP | 2001-035092 | 2/2001 |
|----|-------------|--------|
| JP | 2002-041362 | 2/2002 |
| JP | 2005-107645 | 4/2005 |

* cited by examiner

*Primary Examiner*—Hyung Sough
*Assistant Examiner*—Mardochee Chery
(74) *Attorney, Agent, or Firm*—Mattingly, Stanger, Malur & Brundidge, P.C.

(57) ABSTRACT

A disk array system includes a memory that stores first key data inherent to the disk array system, and a disk controller that controls data input/output to/from disk drives. Each of the disk drives includes a disk medium, and an HDD controller, the disk medium having a system area that stores second key data inherent to a disk array system, and a data area that stores user data, the HDD controller controlling data input/output to/from the system area and the data area. The HDD controller, upon a disk drive from among the disk drives being mounted in the disk array system, comparing the first key data and the second key data, and if they do not correspond to each other, operating in an operation mode in which read access from the disk controller to the data area is prohibited.

18 Claims, 8 Drawing Sheets

FIG.2

KEY DATA TABLE 221

| ITEMS | VALUES |
|---|---|
| KEY DATA | Abc123def4fGh56i |
| ENCRYPTED KEY DATA | ******** |

221a — KEY DATA
221b — ENCRYPTED KEY DATA

FIG.3

USER SETTING TABLE 222

| ITEMS | VALUES | OPERATION MODE |
|---|---|---|
| OPERATION MODE DURING SECURITY CHECK | A | NON-READABLE/WRITABLE |
| | B | NON-READABLE |
| | C | FORCIBLE OVERWRITE |

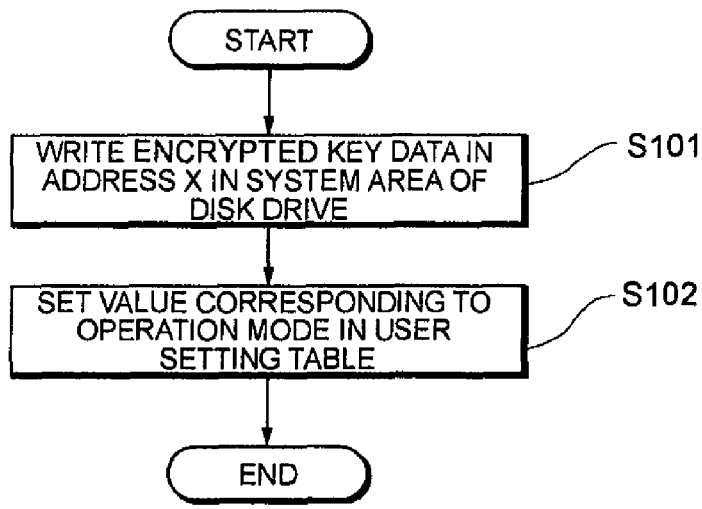
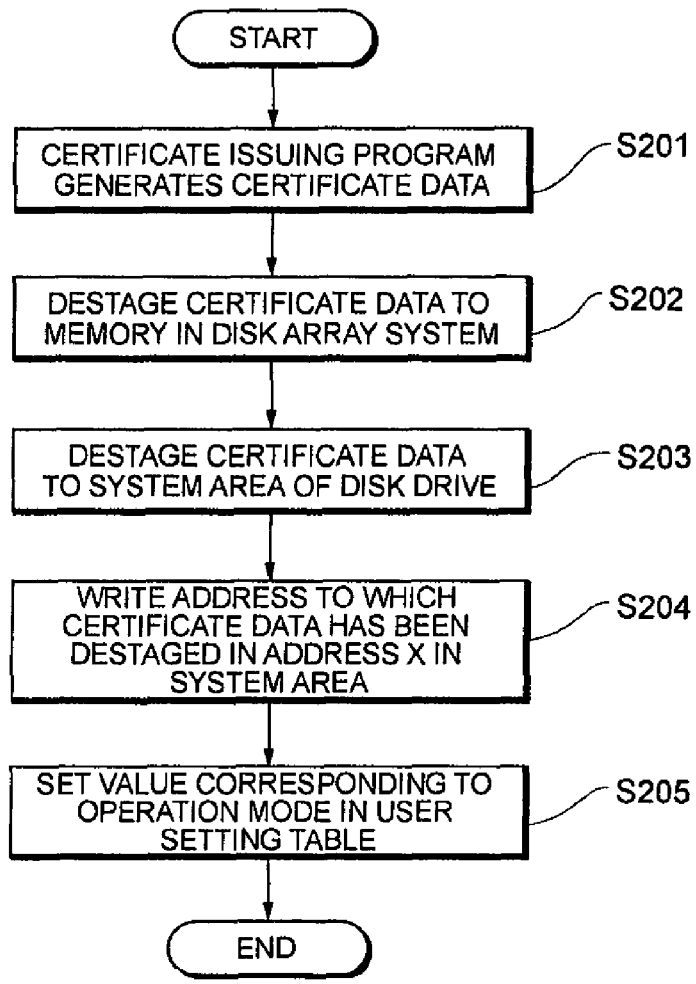

FIG. 9

RAID GROUP MANAGEMENT TABLE

| APPARATUS NUMBER | 1 | 1 | 1 | 2 |
|---|---|---|---|---|
| RAID GROUP NUMBER | 1 | 1 | 2 | 1 |
| LU NUMBER | 1 | 2 | 3 | 1 |
| HOST IDENTIFIER | 1 | 2 | 2 | 2 |
| APPLICATION IDENTIFIER | 1 | 1 | 2 | 2 |
| VALUE | A | A | B | B |

FIG. 10

SETTING SCREEN

1. SELECT APPARATUS
(SELECT FROM LIST OF REGISTERED APPARATUSES SHOWN)

2. SELECT UNIT FOR SETTING

◎ APPARATUS

○ APPLICATION (SELECT FROM LIST OF APPLICATIONS SHOWN)

○ LOGICAL UNIT (SELECT FROM LIST OF LOGICAL UNITS SHOWN)

○ RAID GROUP (SELECT FROM LIST OF RAID GROUPS SHOWN)

3. PROCESSING FOR UNAUTHORIZED ACCESS TO HDD

○ MAKE HDD NON-READABLE/WRITABLE

○ MAKE HDD NON-READABLE

◎ EXECUTE FORCIBLE OVERWRITING OF HDD DATA

DISK ARRAY SYSTEM AND METHOD FOR SECURITY

CROSS-REFERENCES TO RELATED APPLICATIONS

This application relates to and claims priority from Japanese Patent Application No. 2005-334584, filed on Nov. 18, 2005, the entire disclosure of which is incorporated herein by reference.

BACKGROUND

The present invention relates to a disk array system capable of mounting a plurality of disk drives therein, and a method for disk drive security.

In database systems dealing with a huge amount of data, such as a data center, data is managed using a storage system configured separate from the host system. A disk array system is known as an example of these storage systems. A disk array system manages multiple disk drives arranged in an array with the RAID method. In the physical storage areas provided by a group of disk drives, at least one logical unit is formed, and this logical unit is provided to a host system. The host system recognizes the logical unit as one physical device, and performs data access to the logical unit.

In these kinds of disk array systems, a disk drive may be removed or transported from a disk array system for maintenance, etc. Since analysis tools that enable inappropriately reading data stored in the removed disk drive are commercially available, measures to prevent leakage of information are increasingly important. Examples of specific measures include physically destroying a disk drive removed from a disk array system, and erasing all data stored in a disk drive by the method set forth in the regulations provided by the U.S. Government.

JP-A-2002-41362 and JP-A-2001-35092 are known as examples of documents referring to techniques preventing unauthorized storage device access.

SUMMARY

However, the physical destruction of disk drives means the addition of an operational step with customers or vendors incurring extra costs. Moreover, the disk drives cannot be reused, causing the problem of generally leading to an increase in operation costs for disk drives. Also, in order to erase all data stored in a disk drive according to the method set forth in the regulations from the U.S. Government, it is necessary to repeatedly overwrite its entire data area, and therefore, there is also the problem of requiring a long time for erasing the data.

Therefore, an object of the present invention is to prevent leakage of information from a disk drive removed from a disk array system easily and at low cost.

In order to achieve the above object, the disk array system according to the present invention is a disk array system capable of mounting a plurality of disk drives therein. This disk array system includes memory that stores first key data inherent to the disk array system, and a disk controller that controls data input/output to/from the disk drives. Each of the disk drives includes a disk medium, and an HDD controller. The disk medium has a system area that stores second key data inherent to a disk array system, and a data area that stores user data. The HDD controller controls data input/output to/from the system area and the data area. The HDD controller, upon a disk drive being mounted in the disk array system, compares the first key data and the second key data, and if they do not correspond to each other, operates in an operation mode in which at least read access from the disk controller to the data area is prohibited.

The disk array system according to another aspect of the present invention is a disk array system, connected to a host system, capable of mounting a plurality of disk drives therein. This disk array system includes memory that stores first certificate data generated by the host system, and a disk controller that controls data input/output to/from the disk drives. Each of the disk drives includes a disk medium and an HDD controller. The disk medium has a system area that stores second certificate data generated by a host system, and a data area that stores user data. The HDD controller controls data input/output to/from the system area and the data area. The HDD controller, upon a disk drive being mounted in the disk array system, compares the first certificate data and the second certificate data, and if they do not correspond to each other, operates in an operation mode in which at least read access from the disk controller to the disk drive is prohibited.

According to the present invention, information leakage from a disk drive removed from a disk array system can be prevented easily and at low cost.

BRIEF DESCRIPTION OF THE DRAWINGS

FIG. 2 is a diagram explaining a key data table according to an embodiment of the present invention.

FIG. 3 is an explanatory diagram of a user setting table according to an embodiment of the present invention.

FIG. 4 is a flowchart showing a key data write processing routine.

FIG. 5 is a flowchart showing a certificate data write processing routine.

FIG. 9 is a diagram explaining a RAID group management table according to an embodiment of the present invention.

FIG. 10 is a diagram illustrating an operation mode setting screen.

DETAILED DESCRIPTION OF THE PREFERRED EMBODIMENTS

Embodiments of the present invention are explained below with reference to each of the drawings.

Figure 1:
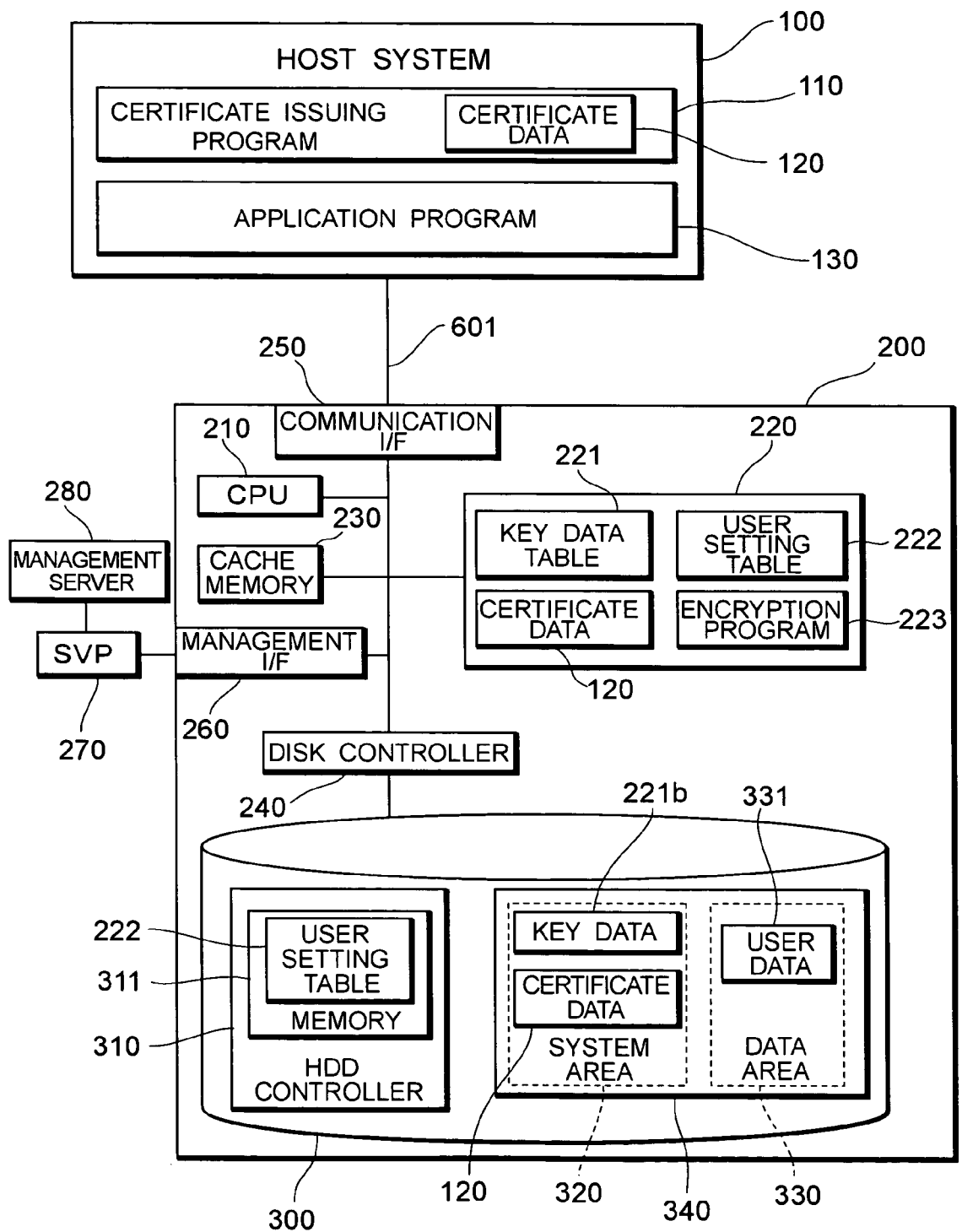
FIG. 1 is a diagram of the configuration of a disk array system according to an embodiment of the present invention.

FIG. 1 is the system configuration of a disk array system 200 according to an embodiment of the present invention. The disk array system 200 is connected to one or more host systems via a communication network 601.

Each of the host systems may be a personal computer, a work station, or a main frame computer. A host system 100 has a certificate issuing program 110, and an application program 130, etc., installed therein. The certificate issuing program 110 generates certificate data (digital certificate) 120 for certifying the host system 100 or the application program 130. Examples of the application program 130 include Web application software, streaming application software, e-business application software, and database software.

For the communication network 601, a SAN (Storage Area Network), a LAN (Local Area Network), a WAN (Wide Area Network), the Internet, a dedicated line, or a public line, etc., may be used. When a host system 100 is connected to the disk array system 200 via a SAN, the host system 100 requests block-based data input/output according to a protocol such as Fibre Channel Protocol or iSCSI (internet Small Computer System Interface) Protocol. When the host system 100 is connected to the disk array system 200 via a LAN, the host system 100 requests file-based data input/output by designating a file name according to a file transfer protocol such as NFS (Network File System) Protocol, or CIFS (Common Interface File System) Protocol. In order for the disk array system 200 to receive a file access request from the host system 100, it is necessary that the disk array system 200 have a NAS (Network Attached Storage) function.

The disk array system 200 includes a CPU 210, memory 220, cache memory 230, a disk controller 240, a communication interface 250, a management interface 260, and disk drive(s) 300.

The CPU 210 controls the host interface between the host system 100 and the disk array system 200. The memory 220, in addition to storing a microprogram for the CPU 210, stores various tables and programs (certificate data 120, a key data table 221, a user setting table 222, and an encryption program 223) for preventing unauthorized access to the disk drive(s) 300. The details of the key data table 221, the user setting table 222, and the encryption program 223 are described later. The cache memory 230 temporarily stores data to be written in or read from the disk drive(s) 300. The cache memory 230 is provided with a backup power supply, and is configured as non-volatile memory preventing cache data loss even when a power failure occurs in the disk array system 200. The disk controller 240, in response to a data input/output request from the host system 100, controls I/O processing (write access or read access) for the disk drive(s) 300. The communication interface 250 is a network component that controls the communication protocol used by the host interface. The management interface 260 is a network component that controls the communication protocol used by a management LAN 602.

The disk drive 300 is a storage device that may be an FC (Fibre Channel) disk drive, a SATA (Serial Advanced Technology Attachment) disk drive, a PATA (Parallel Advanced Technology Attachment) disk drive, a FATA (Fibre Attached Technology Adapted) disk drive, an SAS (Serial Attached SCSI) disk drive, or an SCSI (Small Computer System Interface) disk drive.

The disk drive 300 includes an HDD controller 310, and a disk medium 340. The disk medium 340 has a system area 320 and a data area 330. The HDD controller 310 includes memory 311, and controls data input/output to/from the system area 320 and the data area 330. The memory 311 stores, for example, the aforementioned user setting table 222. The system area 320 stores key data 221b, and the aforementioned certificate data 120, etc. The data area 330 stores user data 331.

A management server 280 is connected to a service processor (SVP) 270 via the management LAN 602. The management LAN 602 may be the Internet or a dedicated line. Communication between the management server 280 and the service processor 270 is conducted via the management LAN 602 according to a communication protocol such as TCP/IP.

The service processor 270 is a management terminal for managing the disk array system 200. A system administrator sends a command for managing the disk array system 200 to the service processor 270 via the management server 280.

Examples of a command for managing the disk array system 200 include a command for instructing the addition or removal of a disk drive 300, or a change in the RAID configuration, a command for setting a communication path between the host system 100 and the disk array system 200, a command for installing a microprogram for the CPU 210 in the memory 220, and a command for confirming the operating status of the disk array system 200 or identifying a defective part in the disk array system 200.

The certificate issuance program 120 may be installed on the management server 280 instead of the host system 100.

FIG. 2 shows the structure of the key data table 221. The key data table 221 retains key data 221a and encrypted key data 221b. The key data 221a is identification information unique to the disk array system 200. A disk array vendor sets the key data 221a and stores it in the key data table 221 pre-shipping. For the key data 221a, a letter string, such as a product number, may be used, but the key data 221a is not limited to that. The key data 221a is stored in the memory 221 in such way that it cannot be accessed from any external interface. The encrypted key data 221b can be obtained by encrypting the key data 221a via the encryption program 223. The encryption algorithm for the encryption program 223 is not specifically determined, and any encryption algorithm can be used.

FIG. 3 shows the structure of master data for the user setting table 222. The user setting table 222 retains a value corresponding to the operation mode run when it is judged as a result of security check processing that any unauthorized access has occurred. Here, three values are shown. Value A indicates setting a disk drive 300 to an operation mode in which read/write operation cannot be performed (a lock function where the drive disk 300 cannot be reused). Value B indicates setting the disk drive 300 to an operation mode in which read operation cannot be performed (a lock function where the disk drive 300 can be reused). In the setting according to value B, it is allowed to make write access to the disk drive 300, so it is possible to reformat the disk drive 300. The reformat will erase the entire data area of user data 331 and system data including the key data 221b and the certificate data 120 in the system area 320. Consequently, the disk drive 300 can be reused. Value C indicates setting the disk drive 300 to an operation mode in which, when the disk drive 300 is supplied with power, a zero or a one is forcibly written over the user data 331 in the data area 330, and makes user data 331 impossible by setting the disk drive 300 to an operation mode in which read operation cannot be performed. When this operation mode is run, a user cannot cancel the overwriting to the user data 331.

These values A, B, and C are stored in the memory 220 of the disk array system 200 via a system administrator's input to the management server 280 or the host system 100. In other words, the system administrator can designate the operation mode to be run when it is judged as a result of security check processing that an unauthorized access has occurred, by selecting any of values A, B, and C.

The drive mode to be run when it is judged as a result of the security check processing that an unauthorized access has occurred may be any operation mode in which the disk drive 300 can physically be reused, and where reading of data from the disk drive 300 is impossible, and is not limited to the above three types of operation mode.

For information used for a security check of the disk drive 300, either of the encrypted key data 221b, and the certificate data 120 may be used, or both may be used. Of course, the key data 221a may be used instead of the encrypted key data 221b.

The encrypted key data 221b and the key data 221a, and the certificate data 120 are different from each other on the following point: the encrypted key data 221b and the key data 221a are mainly used to check the relationship between a disk drive 300 and the disk array system 200, and provide security for preventing a disk drive 300 used in the disk array system 200 from being used in another disk array system or controller, while the certificate data 120 can also be used to check the relationship between a disk drive 300 and the host system 100 (or the application program 130), and provides security for preventing a disk drive 300 used in the host system 100 from being used in another host system.

However, using the certificate data 120 as information used in a security check is more convenient because it makes it possible to conduct a security check by newly uploading the certificate data 120 even when the disk array system 200 is upgraded or is replaced with another system for a reason such as failure.

FIG. 4 shows a processing routine to write the encryption data 221b to a disk drive 300. This processing routine is executed when the disk array system 200 is booted up for the first time, or when a disk drive 300 is first mounted in the disk array system 200.

When this processing routine is called, the disk controller 240 writes the encrypted key data 221b, which is registered in the key data table 221 stored in the memory 220, to an address X in the system area 320 of the disk drive 300 (S101).

Next, the disk controller 240 stores a value set in the user setting table 222 stored in the memory 220 (any value from among value A, B, and C) in the user setting table 222 stored in the memory 311 of the disk drive 300 (S102).

FIG. 5 is a processing routine to write the certificate data 120 to the disk drive 300. The certificate issuing program 110 in the host system 100, on a system administrator's instruction, or triggered by a script, generates certificate data 120 (S201).

Next, the CPU 210 destages the certificate data 120 received from the host system 100 to the memory 220 (S202).

Next, the disk controller 240 destages the certificate data 120 to the system area 320 of the disk drive 300 (S203).

Next, the disk controller 240 writes the address to which the certificate data 120 has been destaged in the address X in the system area 320 (S204). At this time, if any key data 221a or encrypted key data 221b has already been written in the address X in the system area 320, the key data 221a or encrypted key data 221b in the address X can be deleted, and the address in the system area 320 where the certificate data 120 has been overwritten can be written in the address X. If any key data 221a or encrypted key data 221b has already been written in the address X in the system area 320, the address where the certificate data 120 has been written can be written as well in an address Y in the system area 320 without deleting the key data 221a or encrypted key data 221b.

Subsequently, the disk controller 240 stores the value set in the user setting table 222 stored in the memory 220 (any of values A, B, and C) in the user setting table 222 stored in the memory 311 of the disk drive 300 (S205).

Figure 6:
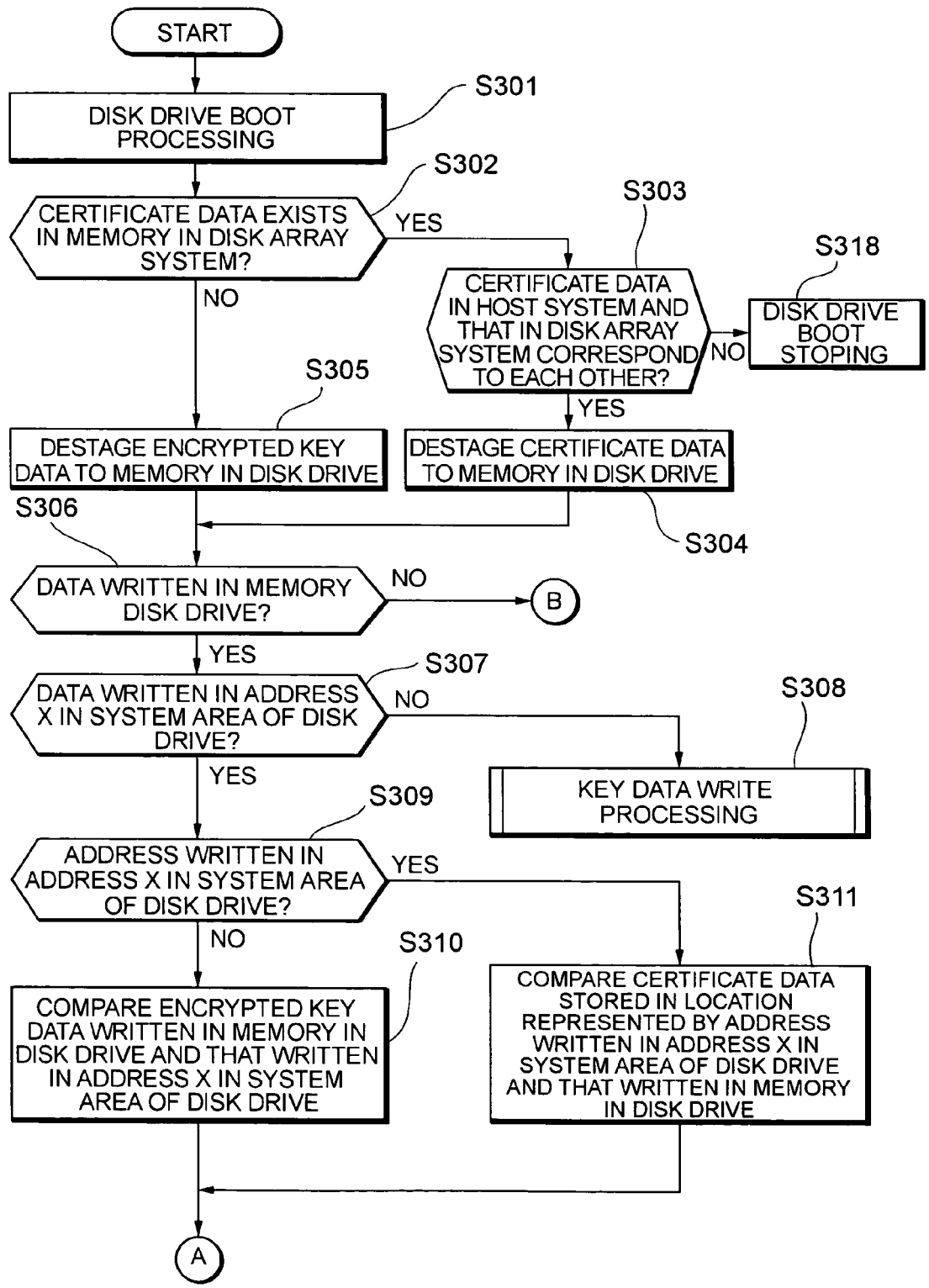
FIG. 6 is a flowchart showing a security check processing routine.
Figure 7:
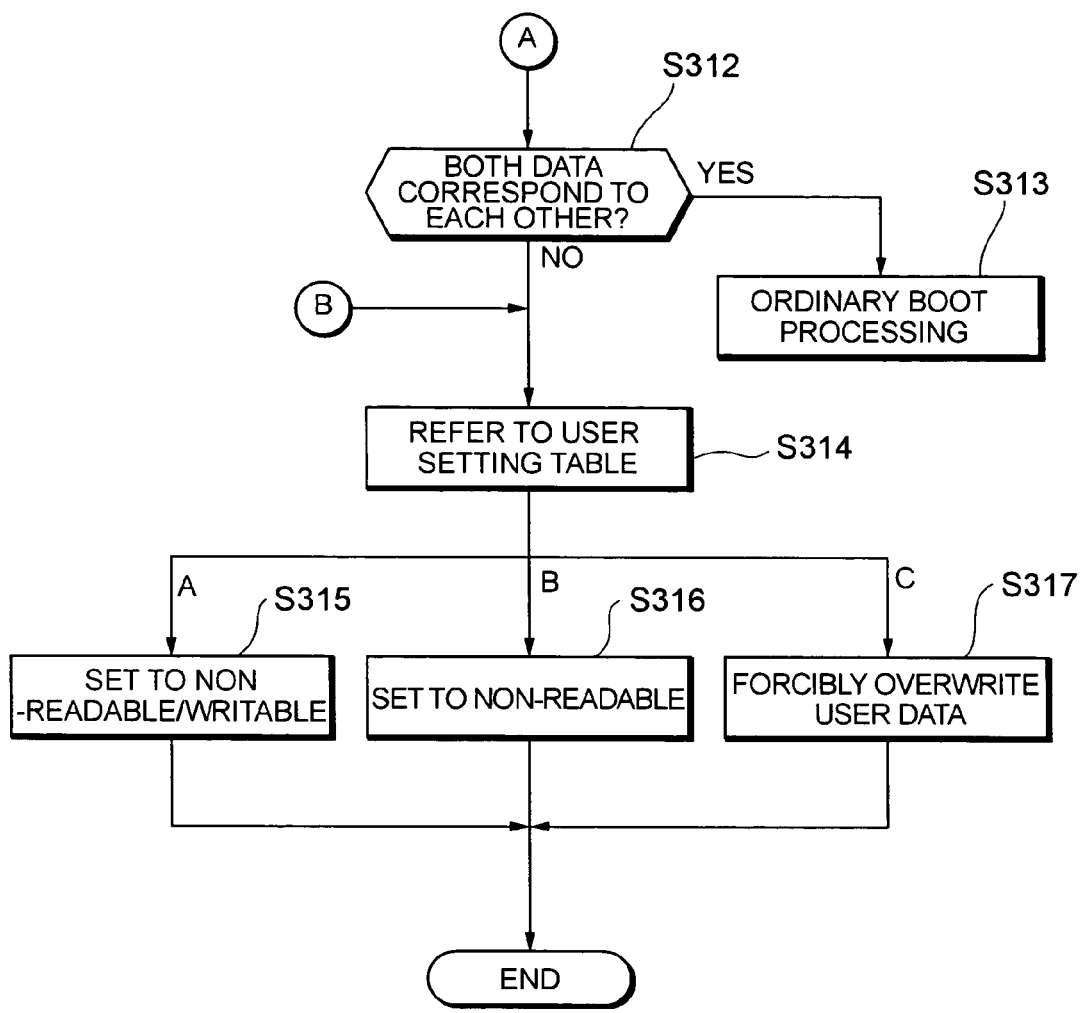
FIG. 7 is a flowchart showing a security check processing routine.

FIGS. 6 and 7 show a security check processing routine. This processing routine is executed upon a disk drive 300 being mounted in the disk array system 200.

Upon a disk drive 300 being mounted in the disk array system 200, the HDD controller 310 starts boot processing for the disk drive 300 (S301).

Next, the disk controller 240 checks whether certificate data 120 exists in the memory 220 in the disk array system 200 (S302).

Then, if certificate data 120 exists in the memory 220 (S302: YES), the disk controller 240 checks whether the certificate data 120 existing in the host system 100, and the certificate data 120 existing in the disk array system 200 correspond to each other (S303).

If the two data are consistent (S303: YES), the disk controller 240 destages the certificate data 120 from the host system 100 or the memory 220 to the memory 311 of the disk drive 300 (S304). Meanwhile, if they are not consistent (S303: NO), the disk controller 240 cancels booting of the disk drive 300, and sends an error message back to the host system 100 (S318).

If no certificate data 120 exists in the memory 220 (S302: NO), the disk controller 240 destages the encrypted key data 221b, which is registered in the key data table 221 stored in the memory 220, to the memory 311 of the disk drive 300 (S305).

Then, the disk controller 240 checks whether the certificate data 120 or the encrypted key data 221b has been written into the memory 311 of the disk drive 300 through the above-described processing at S302 to S305 (S306).

Next, if the disk array system 200 has a security check mechanism according to this embodiment, the certificate data 120 or the encrypted key data 221b is written in the memory 311 of the disk drive 300 through the above-described processing at S302 to S305 (S306: YES), so the disk controller 240 checks whether data is written in the address X in the system area 320 of the disk drive 300 (S307).

If no data is written at the address X in the system area 320 of the disk drive 300 (S307: NO), the disk controller 240 judges that it is the first time the disk drive 300 has been mounted in the disk array system 200, and executes key data write processing (FIG. 4) (S308).

Meanwhile, if data is written in the address X in the system area 320 of the disk drive 300 (S307: YES), the disk controller 240 checks whether the data written in the address X is an address (S309).

If the data written in the address X is not an address (S309: NO), the HDD controller 310 judges the data written in the address X as the encrypted key data 221b, and compares the encrypted key data 221b written in the memory 311 of the disk drive 300, and the encrypted key data 221b written in the address X of the system area 320 of the disk drive 300 with each other (S310).

If the data written in the address X is an address (S309: YES), the HDD controller 310 compares the certificate data 120 stored at the location represented by the address written in the address X, and the certificate data 120 written in the memory 311 of the disk drive 300 (S311).

If, as a result of the processing at S310 or S311, both are judged to be consistent to one another (S312: YES), the HDD controller 310 continues ordinary boot processing.

Meanwhile, if, as a result of the processing at S310 or S311, they are judged as inconsistent to each other, or if the disk array system 200 does not have a security check mechanism according to this embodiment (S306: NO), the HDD controller 310 refers to the user setting table 222 written in the memory 311, and checks which one of values A, B, and C is set (S314).

If value A is set in the user setting table 222 written in the memory 311, the HDD controller 310 sets read/write processing for the disk drive 300 as unexecutable (S315).

If value B is set in the user setting table 222 written in the memory 311, the HDD controller 310 sets read processing for the disk drive 300 as unexecutable (S316).

If value C is set in the user setting table 222 written in the memory 311, the HDD controller 310 makes reading of the user data 331 impossible and forcibly write a zero or a one over the data area 330 of the disk drive 300 (S317).

Figure 8:
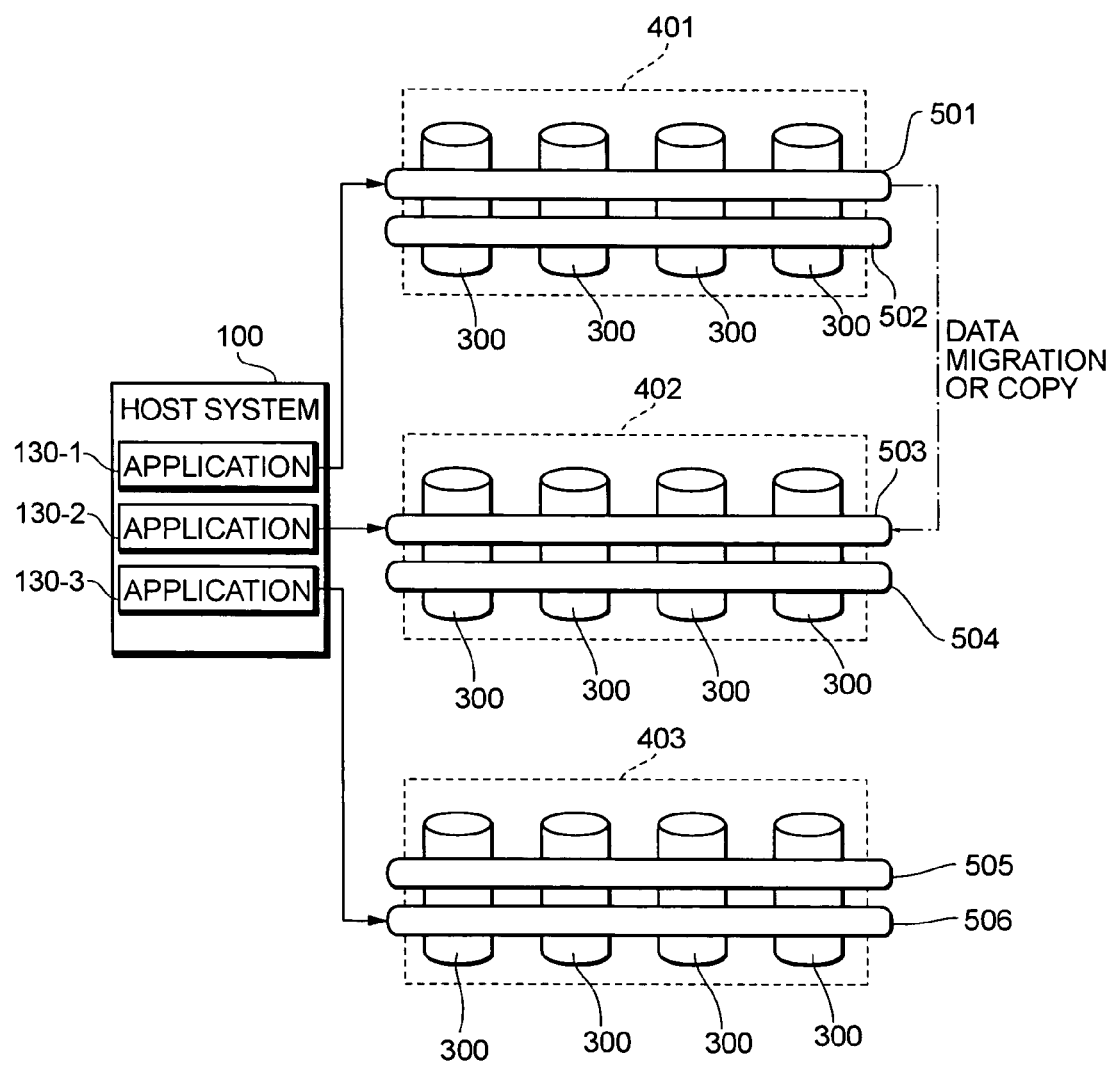
FIG. 8 is a diagram explaining relationships between disk drives, RAID groups, and logical units.

FIG. 8 shows the relationship between the disk drives 300, the RAID groups 401 to 403, and logical units 501 to 506. Each of the RAID groups 401 to 403 is defined by, for example, grouping four disk drives as one set (3D+1P), or eight disk drives 300 as one set (7D+1P). In other words, one RAID group is defined by collecting storage areas provided by a plurality of disk drives 300. One or more of the logical units 501 to 506 can be defined in each of the RAID groups 401 to 403. The RAID groups 401 to 403 may exist in an identical subsystem, or may exist in different disk arrays.

Each of the logical units 501 to 506 is a logical storage unit that the host system 100 is aware of. For example, if the host system 100 is a UNIX®-based system, the logical units 501 to 506 correspond to device files. Otherwise, if the host system 100 is a Windows®-based system, the logical units 501 to 506 correspond to drive letters (drive names). Each of the logical units 501 to 506 is assigned with an inherent LUN (Logical Unit Number). The host system 100 accesses a desired logical unit by designating a LUN or a logical block address.

The above description refers to an example in which an operation mode to be run when it is judged as a result of the aforementioned security check processing that an unauthorized access has occurred is set for each disk drive 300. However, the same operation mode may be set in common for all of the disk drives 300 belonging to one RAID group. For example, value A may be set as a value corresponding to an operation mode for all of the disk drives 300 belonging to the RAID group 401, value B may be set as a value corresponding to an operation mode for all of the disk drives belonging to the RAID group 402, and value C may be set as a value corresponding to an operation mode for all of the disk drives 300 belonging to the RAID group 403.

When the host system 100 has a plurality of application programs 130-1 to 131-3 installed thereon, an operation mode may be set for a RAID group in which a logical unit used by each of the application programs 130-1 to 130-3 is defined. For example, value A may be set as a value corresponding to an operation mode for all of the disk drives 300 belonging to the RAID group 401 in which the logical unit 501 used by the application program 130-1 is defined, value B may be set as a value corresponding to an operation mode for all of the disk drives 300 belonging to the RAID group 402 in which the logical unit 503 used by the application program 130-2 is defined, and value C may be set as a value corresponding to an operation mode for all of the disk drives 300 belonging to the RAID group 403 in which the logical unit 506 used by the application program 130-3 is defined.

FIG. 9 shows the RAID group management table 224. The apparatus number is a number for identifying a disk array system 200. The RAID group number is a number for identifying a RAID group. The LU number is a number for identifying a logical unit. The host identifier is identification information for identifying a host system 100. The application identifier is identification information for identifying an application program 130. The value means value A, value B, or value C. RAID group management table 224 is managed at the host or the management server 280 which is coordinated with system components such as storage devices, host devises, and applications running on hosts. By using the RAID group management table 224 as the input for the user setting table 222 on memory 311 of HDD controller 310, operation mode can be set not only in units of disk drives, but also in units of RAID groups, LUs, host systems, or application programs. For example, the HDD controller 310 can set an operation mode in common for all of the disk drives 300 belonging to an identical RAID group, and can also set a different operation mode per RAID group for each host system 100 or application program 130 using logical units.

FIG. 10 shows a setting screen for configuring settings for the RAID group management table 224. This setting screen is shown on a display in the management server 280.

The case of data migration or data copy being performed between a plurality of logical units where an operation mode is set is explained below. For example, it is assumed that value A is set as the operation mode for the logical unit 501, and value B is set as the operation mode for the logical units in RAID group 402 in FIG. 8. Upon data in the logical unit 501 being migrated to the logical unit 503, the operation mode set for the data in logical unit 501 changes from value A to value B. Practical examples include the case where the operation mode set for an LU may be changed according to a change in security level (e.g., a change from "value C," which is an operation mode at the risk of data loss, to "value A," which is an operation mode in which data storage stability is ensured. For example, there is a technique called data lifecycle management in which data storage locations change according to the level of importance of business data to a user, or according to the importance of data that changes over time. It is assumed that data with a high level of importance is stored in a highly-reliable, high-performance, and high-cost configuration (e.g., RAID 10 (4D+4P) using Fibre Channel disk drives), and that the operation mode is set to "value C" because of high security requirements. When the level of importance of the data changes due to the user's own reasons, and the data is stored in a low-cost configuration (RAID5 (4D+1P) using SATA disk drives) as archive data, data may be migrated to drives with a low-cost configuration set to "value A" that only performs data protection at the disk drive level. Also, the operation mode may change by executing replication between a plurality of logical units. In the case of replication, it can be assumed that one volume contains master data, and the other volume contains back-up data. In this case, it is desirable from the viewpoint of operation that the LU containing the master data is set to "value A" or "value B" because the setting of the LU to "value C," which exhibits the highest data security, may cause data loss by a human error.

A change in operation mode accompanied by data migration involves exchange of the LU number for a migration destination logical unit and the LU number for a migration source logical unit. Thus, the host system 100 will not be aware of the data migration between the plurality of logical units. Accordingly, it is not necessary for the host system 100 to perform switching of the logical units when making access to these logical units. Meanwhile, a change in operation mode accompanied by replication does not involve exchange of the LU number for the migration destination logical unit, and the LU number for the migration source logical unit, so the host system 100 is aware there was data copy between these logical units. Accordingly, it is necessary for the host system 100 to perform switching of the logical units when making access to these logical units.

Figure 11:
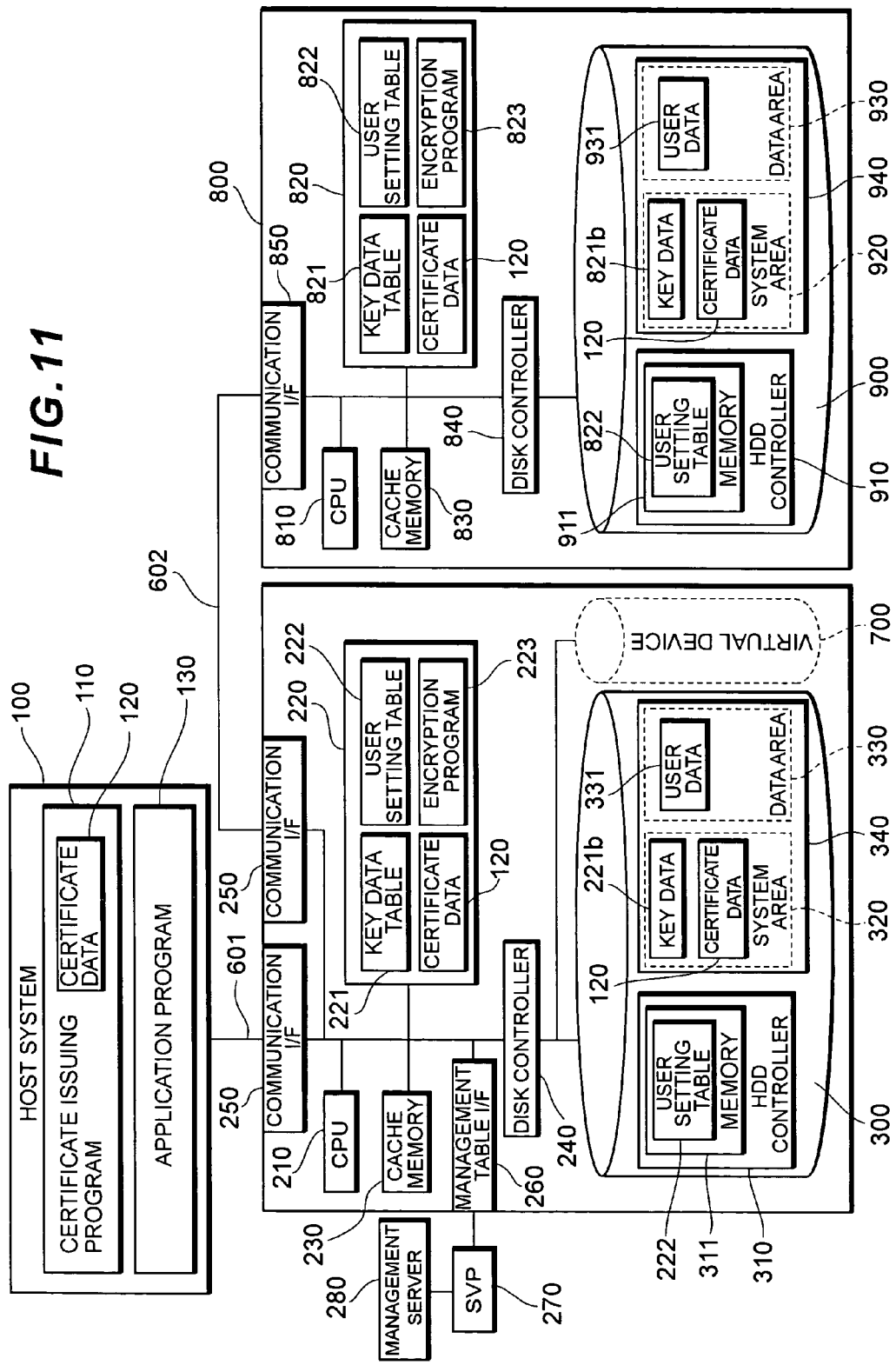
FIG. 11 is a system configuration diagram explaining the overview of the external connection of a disk array system.

FIG. 11 is a system configuration diagram showing the overview of another disk array system 800 externally connected to the disk array system 200. In this figure, the detailed explanation of the devices, etc., having the same reference numerals as those shown in FIG. 1 is omitted as they indicate the same devices, etc. The disk array system 800 is externally connected to the disk array system 200 via a communication network 602.

The disk array system 800 includes a CPU 810, memory 820, cache memory 830, a disk controller 840, a communication interface 850, a management interface 860, and disk drive(s) 900.

The memory 820, in addition to storing a microprogram for the CPU 810, stores various tables and programs for preventing unauthorized access to the disk drive(s) 900 (the certificate data 120, the key data table 821, the user setting table 822, and the encryption program 823). The key data table 821 stores key data 821b that will be described later. The key data 821b is identification information inherent to the disk array system 800 or information prepared by encrypting the identification information.

The disk drive 900 includes a HDD controller 910, and a disk medium 940. The disk medium 940 has a system area 920, and a data area 930. The HDD controller 910 includes memory 911, and controls data input/output to/from the system area 920 and the data area 930. The memory 911 stores, for example, the aforementioned user setting table 822, etc. The system area 920 stores the key data 821b, and the aforementioned certificate data 120, etc. The data area 930 stores user data 931.

The disk array system 200 includes a virtual device 700. The virtual device 700 is a virtual one having no real storage area. The actual device for that virtual device 700 where data is stored is present in the disk drives 900 of the disk array system 800. In other words, the virtual device 700 is created by the disk drives 900 in the disk array system 800 being mapped in a storage tier in the disk array system 200. Mapping refers to associating address spaces between devices. A device associated with another device may be a real device, or a virtual device. The disk array system 200 virtually incorporates the disk drives 900 as its internal device, and provides it to the host system 100 as logical units. A technique to map disk drives 900 that exist outside the disk array system 200 in the virtual device 700 that exists inside the disk array system 200 is disclosed in JP-A-2005-107645.

Security check processing in the disk array system 800 is the same as that in the disk array system 200. However, the certificate data 120 used in security check processing in the disk array system 800 is provided to the disk array system 800 from the host system 100 via the disk array system 200.

Use of the aforementioned external connection technique makes it possible to copy only the user data 331, with the key data 221b and the certificate data 120 excluded, from the disk drive 300 mounted in the disk array system 200 to the disk drive 900 mounted in the disk array system 800. When this copying is executed via an instruction from the host system 100 or the management server 280, it is preferable that a warning is sent to the system administrator to let the administrator know that only copying of the user data 331 is possible.

It is also possible to use a part of a plurality of disk drives 300 mounted in the disk array system 200 as data disks, and another part of the disk drives 300 as spare disks. For example, upon occurrence of a failure in a data disk, correction copy can be performed from the data disk to a spare disk, and upon the error rate for a data disk exceeding a predetermined threshold value, dynamic sparing can be performed from the data disk to a spare disk. However, when performing correction copy or dynamic copy, it is not necessary to copy the key data 221b or the certificate data 120 from the data disk to the spare disk. This is because when the spare disk is first mounted in the disk array system 200, the key data 221b or the certificate data 120 is written in the spare disk. Also, copy from a data disk to another data disk within an identical chassis does not require copying of the key data 221b or the certificate data 120.

When any unauthorized access occurs to the address X in the system area 320 of the disk medium 340, an operation mode corresponding to value A, value B, or value C may be run.

What is claimed is:

1. A disk array system capable of mounting a plurality of disk drives, comprising:
    a memory arranged to store operation mode values, certificate data, and key data inherent to the disk array system; and
    a disk controller that controls data input/output to/from the disk drives;
    wherein each of the disk drives includes a disk medium and an HDD controller, the disk medium having a system area including an address X arranged to store data, and a data area arranged to store user data, the HDD controller controlling data input/output to/from the system area and the data area;
    wherein the disk controller is arranged to destage the certificate data to the system area, and to write the address of the destaged certificate data in the address X in the system area;
    wherein, upon a disk drive from among the disk drives being mounted in the disk array system, the disk controller determines whether the data stored in the address X is an address;
    if the data stored in the address X is determined not to be an address, the HDD controller compares the data stored in the address X with the key data stored in the memory, and if they do not correspond to each other, operates in an operation mode according to one of the operation mode values read from the memory, in which at least read access from the disk controller to the data area is prohibited; and
    if the data stored in the address X is determined to be an address, the HDD controller compares the certificate data stored at the address stored in the address X with the certificate data stored in the memory, and if they do not correspond to each other, operates in an operation mode according to one of the operation mode values read from the memory, in which at least read access from the disk controller to the data area is prohibited.

2. The disk array system according to claim 1, wherein the operation mode is one of: (1) an operation mode in which read access from the disk controller to the data area is prohibited; (2) an operation mode in which both read access and write access from the disk controller to the data area are prohibited; and (3) an operation mode in which a zero or a one is forcibly written over the user data.

3. The disk array system according to claim 1, wherein the data stored in the address X, which is determined not to be an address, is key data that is stored in the address X upon a disk drive from among the disk drives being first mounted in a disk array system.

4. The disk array system according to claim 1, wherein the operation mode is set in common for all of the disk drives belonging to an identical RAID group.

5. The disk array system according to claim 1, wherein the operation mode values, according to one of which the operation mode operates, are set changeably in units of one or more of disk drives, RAID groups, logical units, host systems, or application programs.

6. The disk array system according to claim 1, wherein operation mode settings for the operation mode are changeably set externally of said disk array system.

7. A disk array system, connected to a host system, capable of mounting a plurality of disk drives, comprising:
 a memory arranged to store operation mode values and first certificate data generated by the host system; and
 a disk controller that controls data input/output to/from the disk drives;
 wherein each of the disk drives includes a disk medium and an HDD controller, the disk medium having a system area arranged to store second certificate data generated by a host system, and a data area arranged to store user data, the HDD controller controlling data input/output to/from the system area and the data area;
 wherein the disk controller is arranged to destage the first certificate data to the system area as the second certificate data, and to write the address of the second certificate data in an address X in the system area; and
 wherein the HDD controller, upon a disk drive from among the disk drives being mounted in the disk array system, compares the first certificate data and the second certificate data read from the address read out from the address X, and if they do not correspond to each other, operates in an operation mode according to one of the operation mode values read from the memory, in which at least read access from the disk controller to the disk drive is prohibited.

8. The disk array system according to claim 7, wherein the operation mode is one of: (1) an operation mode in which read access from the disk controller to the data area is prohibited; (2) an operation mode in which both read access and write access from the disk controller to the data area are prohibited; and (3) an operation mode in which a zero or a one is forcibly written over the user data.

9. The disk array system according to claim 7, wherein the operation mode is set in common for all of the disk drives belonging to an identical RAID group.

10. The disk array system according to claim 7, wherein the operation mode values, according to one of which the operation mode operates, are set changeably in units of one or more of disk drives, RAID groups, logical units, host systems, or application programs.

11. The disk array system according to claim 7, wherein operation mode settings for the operation mode are changeably set externally of said disk array system.

12. A method for security comprising the steps of:
 detecting a disk drive being mounted in a disk array system connected to a host system;
 destaging first certificate data, generated by a host system, from a memory in the disk array system to a system area of the disk drive as second certificate data;
 writing the address of the second certificate data in an address X of the system area;
 determining whether data stored in the address X is an address;
 if the data stored in the address X is determined not to be an address;
  reading first key data inherent to the disk array system, the first key data being stored in the memory in the disk array system;
  reading second key data inherent to a disk array system, the second key data being stored in system area in the disk drive;
  comparing the first key data and the second key data; and
  upon the first key data and the second key data not corresponding to each other, operating in an operation mode according to one of a plurality of operation mode values stored in and read from the memory, the operation mode being one of: (1) an operation mode in which read access from the disk array system to the disk drive is prohibited; (2) an operation mode in which both read access and write access from the disk array system to the disk drive are prohibited; and (3) an operation mode in which a zero or a one is forcibly written over user data in the disk drive; and
 if the data stored in the address X is determined to be an address:
  reading the first certificate data from the memory;
  reading the second certificate data from the address X;
  comparing the first certificate data and the second certificate data; and
  upon the first certificate data and the second certificate data not corresponding to each other, operating in the operation mode according to one of the operation mode values.

13. The method for security according to claim 12, wherein the second key data, upon the disk drive being first mounted in a disk array system, is stored in the system area of the disk drive.

14. The method for security according to claim 12, wherein the operation mode is set in common for all of the disk drives belonging to an identical RAID group.

15. The method for security according to claim 12, wherein the operation mode values, according to one of which the operation mode operates, are set changeably in units of one or more of disk drives, RAID groups, logical units, host systems, or application programs.

16. The method for security according to claim 12, further comprising the step of changeably setting operation mode settings via a setting screen for configuring the operation mode settings.

17. A disk array system capable of mounting a plurality of disk drives, comprising:
 a memory arranged to store operation mode values and first key data inherent to the disk array system; and
 a disk controller that controls data input/output to/from the disk drives;
 wherein each of the disk drives includes a disk medium and an HDD controller, the disk medium having a system area arranged to store second key data inherent to a disk array system, and a data area arranged to store user data, the HDD controller controlling data input/output to/from the system area and the data area;
 wherein the HDD controller, upon a disk drive from among the disk drives being mounted in the disk array system, compares the first key data and the second key data, and if they do not correspond to each other, operates in an operation mode according to one of the operation mode values read from the memory, in which at least read access from the disk controller to the data area is prohibited; and
 wherein the operation mode values, according to one of which the operation mode operates, are set changeably in units of one or more of disk drives, RAID groups, logical units, host systems, or application programs.

18. A method for security comprising the steps of:
 detecting a disk drive being mounted in a disk array system;
 reading first key data inherent to the disk array system, the first key data being stored in a memory in the disk array system;

reading second key data inherent to a disk array system, the second key data being stored in a system area in the disk drive;

comparing the first key data and the second key data;

upon the first key data and the second key data not corresponding to each other, operating in an operation mode according to one of a plurality of operation mode values stored in and read from the memory, the operation mode being one of: (1) an operation mode in which read access from the disk array system to the disk drive is prohibited; (2) an operation mode in which both read access and write access from the disk array system to the disk drive are prohibited; and (3) an operation mode in which a zero or a one is forcibly written over user data in the disk drive; and changeably setting operation mode settings of the operation modes via a setting screen for configuring the operation mode settings.

* * * * *